United States Patent
Liu et al.

(10) Patent No.: US 10,477,547 B2
(45) Date of Patent: Nov. 12, 2019

(54) ULTRA-LARGE BANDWIDTH DATA TRANSMISSION METHOD, DEVICE AND COMPUTER STORAGE MEDIUM

(71) Applicant: ZTE Corporation, Shenzhen (CN)

(72) Inventors: Wenhao Liu, Shenzhen (CN); Guanghui Yu, Shenzhen (CN); Zhaohua Lu, Shenzhen (CN); Senbao Guo, Shenzhen (CN); Bo Dai, Shenzhen (CN)

(73) Assignee: ZTE CORPORATION (CN)

( * ) Notice: Subject to any disclaimer, the term of this patent is extended or adjusted under 35 U.S.C. 154(b) by 173 days.

(21) Appl. No.: 15/105,984

(22) PCT Filed: Jun. 13, 2014

(86) PCT No.: PCT/CN2014/079848
§ 371 (c)(1),
(2) Date: Jun. 17, 2016

(87) PCT Pub. No.: WO2014/187420
PCT Pub. Date: Nov. 27, 2014

(65) Prior Publication Data
US 2017/0034824 A1 Feb. 2, 2017

(30) Foreign Application Priority Data
Dec. 20, 2013 (CN) .......................... 2013 1 0714909

(51) Int. Cl.
*H04L 12/28* (2006.01)
*H04W 72/04* (2009.01)
*H04L 5/00* (2006.01)
*H04L 5/14* (2006.01)

(52) U.S. Cl.
CPC ....... *H04W 72/0453* (2013.01); *H04L 5/0064* (2013.01); *H04L 5/0082* (2013.01); *H04L 5/14* (2013.01); *H04L 5/0023* (2013.01)

(58) Field of Classification Search
CPC ....................................................... H04L 5/14
(Continued)

(56) References Cited

U.S. PATENT DOCUMENTS 9,591,582 B1 * 3/2017 Rabii ................. H04W 52/028
2007/0168841 A1 7/2007 Lakkis
(Continued)

FOREIGN PATENT DOCUMENTS

CN 1913508 A 2/2007
CN 101404539 A 4/2009
(Continued)

OTHER PUBLICATIONS

International Search Report in international application No. PCT/CN2014/079848, dated Sep. 19, 2014.
(Continued)

*Primary Examiner* — Dang T Ton
(74) *Attorney, Agent, or Firm* — McDonald Hopkins LLC

(57) ABSTRACT

The present invention embodiment discloses an ultra-large bandwidth data transmission method, device and computer storage medium, said method comprising: a data transmission device sending data in accordance with a sub-frame level approach at a specified bandwidth of a long term evolution (LTE) system; wherein, the sampling rate of the data transmission device is m/n times a sampling rate corresponding to said specified bandwidth LTE system, m and n being positive integers.

20 Claims, 6 Drawing Sheets

(58) Field of Classification Search
USPC .......................................................... 370/392
See application file for complete search history.

(56) References Cited

U.S. PATENT DOCUMENTS

| | | |
|---|---|---|
| 2008/0130485 A1 | 6/2008 | Yang |
| 2010/0151799 A1 | 6/2010 | Kim |
| 2013/0148527 A1 | 6/2013 | Awiniyi et al. |
| 2013/0308596 A1 | 11/2013 | Nam et al. |

FOREIGN PATENT DOCUMENTS

| | | |
|---|---|---|
| CN | 101426283 A | 5/2009 |
| CN | 102468951 A | 5/2012 |
| EP | 1914917 A1 | 4/2008 |
| EP | 1976208 A1 | 10/2008 |
| WO | 2009052420 A2 | 4/2009 |

OTHER PUBLICATIONS

English Translation of the Written Opinion of the International Search Authority in international application No. PCT/CN2014/079848, dated Sep. 19, 2014.

Supplementary European Search Report in European application No. 14800595.2, dated Oct. 25, 2016.

3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7), mailed in Sep. 2006.

3GPP TSG-RAN1 Meeting #40bis R1-050267 Proposal for the Downlink Multiple Access Scheme for E-UTRA Nortel, mailed on Apr. 4, 2005.

3GPP TSG-RAN1 Meeting #41 R1-050484 Proposal for the Downlink Multiple Access Scheme for E-UTRA (Update), mailed on May 9, 2005.

3GPP TSG RAN WG1 Ad Hoc on LTE Sophia Antipolis, France, Jun. 20-21, 2005 R1-050587 NTT DoCoMo, Fujitsu, Intel Corporation, Mitsubishi Electric, NEC, SHARP OFDM Radio Parameter Set in Evolved UTRA Downlink, mailed on Jun. 20, 2005.

R1-050603 RAN1 Ad Hoc on LTE Sophia Antipolis, France Jun. 20-21, 2005 Agenda item: 4.2 E-UTRA Downlink OFDM Numerology Texas Instruments, mailed on Jun. 20, 2005.

RF and AMS Radio-Frequency and Analog/ Mixed-Signal Circuits and Devices for Wireless Communications, mailed on Nov. 25, 2014.

* cited by examiner

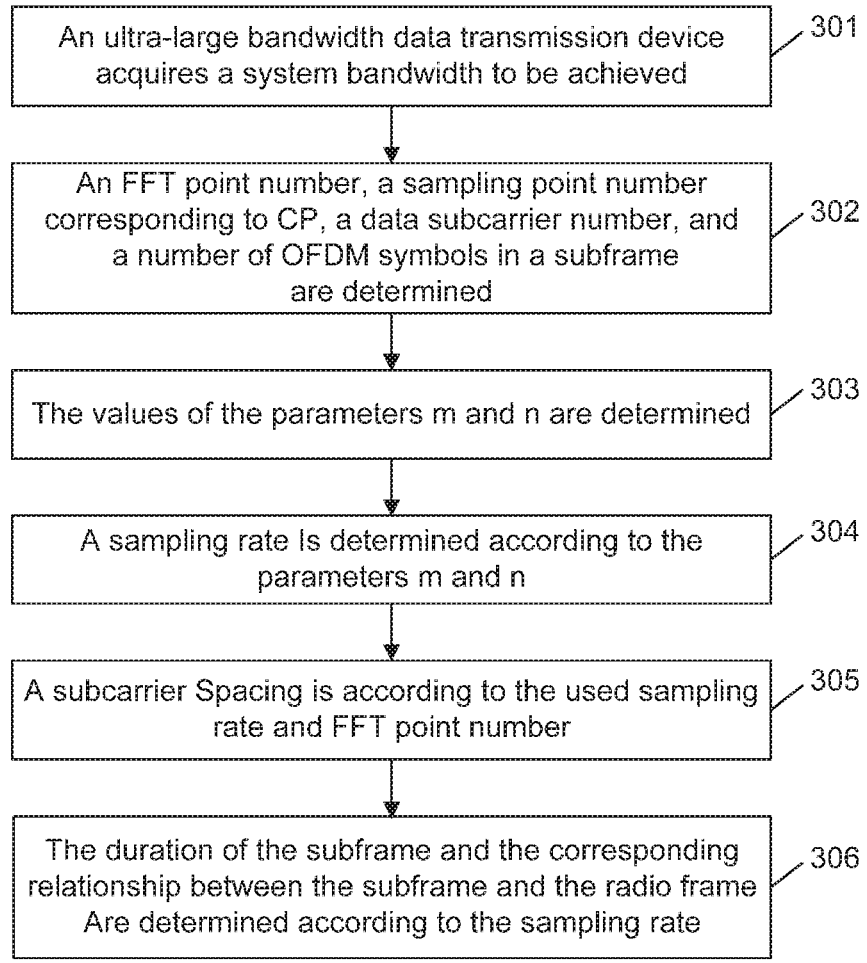

ULTRA-LARGE BANDWIDTH DATA TRANSMISSION METHOD, DEVICE AND COMPUTER STORAGE MEDIUM

TECHNICAL FIELD

The present invention relates to the technical field of high frequency band wireless communications, and in particular to an ultra-large bandwidth data transmission method, device and computer storage medium.

BACKGROUND

With the constant progress of radio technology, the generalization of various intelligent terminals and the growth of data service, the amount of mobile communication traffic will have a 1-fold increase per year in the future, and the research target of the METIS (Mobile and Wireless Communications Enablers for the Twenty-Twenty Information Society) with relation to 5G mobile communication technology has been established: the data service will grow 1000 times within 10 years in the future.

The current 4G system has used a plurality of technologies, including: OFDM, (Orthogonal Frequency Division Multiplexing), MIMO (Multiple Input Multiple Output), MU-MIMO (Multi-User MIMO), and HARQ (Hybrid Automatic Repeat reQuest), aiming at improving the frequency spectrum efficiency of cells, and improving the system capacity of a specific cell through a small cell technology. However, these technologies still can not satisfy the requirement for the exponential increase of the 5G communication data volume.

SUMMARY

The embodiments of the disclosure provide an ultra-large bandwidth data transmission method, device and computer storage medium, capable of satisfying the high frequency band, large bandwidth, and low delay data transmission requirements, and capable of being implemented simply.

The technical solutions of the embodiments of the disclosure are implemented as follows.

The embodiments of the disclosure provide an ultra-large bandwidth data transmission method, including:

a data transmission device transmits data in a subframe level manner of a Long Term Evolution (LTE) system with a specific bandwidth, herein a sampling rate of the data transmission device is m/n times of a sampling rate corresponding to the LTE system with the specific bandwidth, m and n being positive integers.

The embodiments of the disclosure further provide an ultra-large bandwidth data transmission device, including:

a transmission unit configured to transmit data in a subframe level manner of an LTE system with a specific bandwidth, herein a sampling rate of the transmission unit is m/n times of a sampling rate corresponding to the LTE system with the specific bandwidth, m and n being positive integers; and a determination unit configured to determine values of the parameters m and n.

The embodiments of the disclosure further provide a computer storage medium having stored therein a computer executable instruction for executing the aforementioned ultra-large bandwidth data transmission method.

The embodiments of the disclosure have the following beneficial effects:

1) the implementation of high frequency, large bandwidth and high throughput data transmission through the embodiments of the disclosure;

2) capable of being implemented in an easy way, and the sampling level compatible with LTE;

3) provision of smaller transmission delay, and the adaptation to the applications having higher requirement for real time performance.

BRIEF DESCRIPTION OF THE DRAWINGS

FIG. 2 is an implementation flow diagram of an ultra-large bandwidth data transmission method according to an embodiment of the disclosure;

FIG. 3 is a schematic flowchart showing that the an ultra-large bandwidth data transmission device determines a data transmission parameter according to an embodiment of the disclosure;

DETAILED DESCRIPTION

The disclosure will be further elaborated hereinafter in connection with the drawings and embodiments. What should be explained is that the characteristics of the embodiments of the present invention can be combined if there are no conflicts.

In the frequency ranges 300 MHz-3 GHz and 3-300 GHz used by mobile communication systems, quite a number of frequency spectrum resources are still not utilized. In addition to the means such as improving spectrum efficiency and cell density and the like, those novel frequency spectrum resources of larger bandwidth can be utilized to achieve higher throughput service transmission, where the 3-30 GHz range is referred to as SHF (Super High Frequency) wave band, and the 30-300 GHz range is referred to as EHF (Extremely High Frequency) wave band. The inventor finds out during the implementation of the present invention that a cell network can utilize those frequency spectrum resources to improve the throughput of a wireless network during next generation evolution.

The air interface delay of the LTE system is at millisecond level. Considering that an application has an increasingly improved requirement for real time performance, but the delay of the LTE in relevant art can only satisfy the real time application requirement for voice services, but cannot satisfy the stricter real time requirement for the time delay of the large data volume service of a 3D-based application in the future. Therefore, the embodiment of the disclosure provides a solution for achieving lower time delay.

Furthermore, high throughput means high processing speed. Therefore, during the implementation of the present invention, the inventor also gives consideration to the design complexity problem of the data transmission device, so that the solution can be compatible with the sampling level of the LTE in relevant art.

Figure 1A:
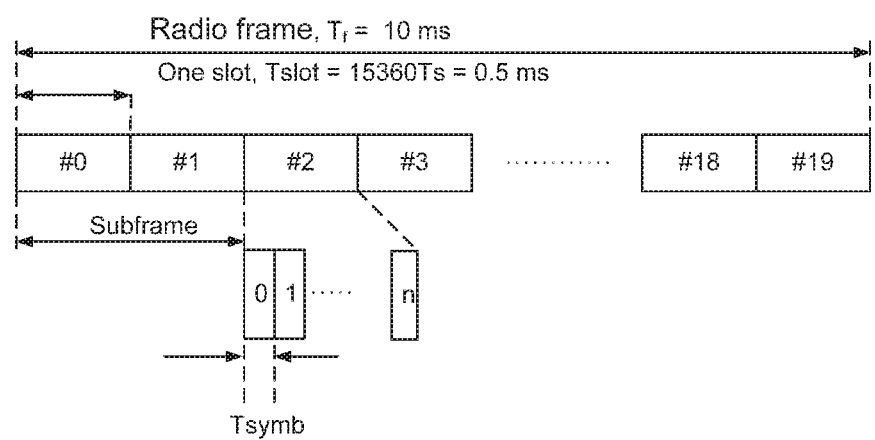
FIG. 1a is a structural diagram of an LTE FDD frame.

FIG. 1a is a structural diagram of an LTE FDD (Frequency Division Duplexing) mode frame. As shown in FIG. 1a, the duration $T_f$ of one radio frame is 10 ms; one radio frame comprises ten subframes, the duration of each subframe being 1 ms; the duration $T_{slot}$ of one slot in the subframe is 0.5 ms corresponding to 15360 sampling periods Ts.

Figure 1B:
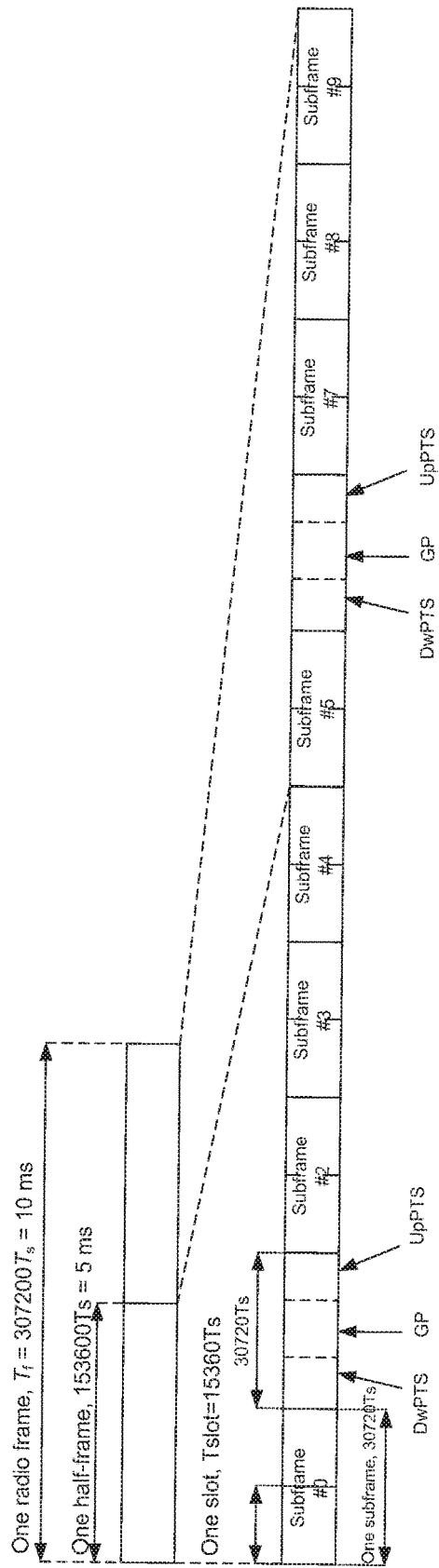
FIG. 1b is a structural diagram of an LTE TDD frame.

FIG. 1b is a structural diagram of an LTE TDD (Time Division Duplexing) mode frame. As shown in FIG. 1b, one radio frame consists of two half-frames having a length of 5 ms; one half-frame consists of five subframes having a length of 1 ms, the duration of one subframe corresponding to 30720 Ts; the duration $T_{slot}$ of one slot in the subframe is 0.5 ms corresponding to 15360 Ts.

The TDD mode radio frame further includes a special subframe, the special subframe including a DwPTS (Downlink Pilot Time Slot), an UpPTS (Uplink Pilot Time Slot) and a GP (Guard Period). The period (Tsymb) of one OFDM symbol is related to subcarrier spacing and CP (Cyclic Prefix) overhead.

The CP includes a normal CP and an extended CP; the corresponding time of the uplink symbol $N_{sc}^{RB}$, downlink symbol $N_{symb}^{DL}$ and guard period Δf corresponding to the uplink and downlink configuration of different types of CP is as shown in table 1.

TABLE 1

| Configuration | | $N_{sc}^{RB}$ | $N_{symb}^{DL}$ |
|---|---|---|---|
| Normal CP | Δf = 15 KHz | 12 | 7 |
| Extended CP | Δf = 15 KHz | | 6 |
| | Δf = 7.5 KHz | 24 | 3 |

According to the restriction conditions such as the spectral distribution situation of high frequency band, the features of future applications, the implementation complexity and the like, the embodiment of the disclosure provides a high frequency band, large bandwidth, low delay and low complexity ultra-large bandwidth data transmission method suitable for wireless communication, as shown in FIG. 2, the method including:

Step 201, a data transmission device transmits data in a subframe level manner of an LTE system with a specific bandwidth, herein a sampling rate of the data transmission device is m/n times of a sampling rate corresponding to the LTE system with the specific bandwidth, m and n being positive integers.

As an embodiment, the step that the data transmission device transmits the data in the subframe level manner of the LTE system with the specific bandwidth can be achieved by the means as follows:

when the data transmission device transmits the data, the data transmission device adopts an FFT (Fast Fourier Transformation) point number corresponding to the LTE system with the specific bandwidth, a sampling point number corresponding to the OF, a data subcarrier number, and a number of Orthogonal Frequency Division Multiplexing (OFDM) symbols in a subframe;

herein, specific bandwidth comprises 1.4 MHz bandwidth, 3 MHz bandwidth, 5 MHz bandwidth, 10 MHz bandwidth and 20 MHz bandwidth.

As an embodiment, the step that the data transmission device transmits the data in the subframe level manner of the LTE system with the specific bandwidth may include:

the data transmission device transmits the data using a radio frame containing 10 subframes; or, the data transmission device transmits the data using a radio frame containing a specific number of subframes, herein the specific number of subframes is used for enabling the length of the radio frame to be closest to an integral multiple of 10 ms, and a sum of a number of OFDM symbols of a DwPTS, a number of OFDM symbols of a GP and a number of OFDM symbols of an UpPTS in a special subframe of the radio frame corresponds to a number of OFDM symbols of one subframe; the value range of the number of OFDM symbols of the DwPTS in the special subframe of the radio frame is from 1 to 10; the value range of the number of OFDM symbols of the GP is from 1 to 4; and the value range of the number of OFDM symbols of the UpPTS is from 1 to 10.

As an embodiment, m is a product of nonnegative integral powers of a specific prime number, and n is less than m. For ease of implementation, m may have a value of the product of nonnegative integral powers of 2. However, using only the product of nonnegative integral powers of 2 will result in relatively few sampling rates (i.e. inadequate flexibility). Therefore, the embodiment of the disclosure further introduces a combination of powers of other prime numbers, in this way, the obtained sampling rate is more selective, thus facilitating system design. Accordingly, the specific prime number can be 2, 3 or 5.

As an embodiment, the LTE system with the specific bandwidth may have an LTE TDD mode and an LTE FDD mode.

As an embodiment, a CP used by the LTE system with the specific bandwidth may include a normal CP and an extended CP.

Before the data transmission device transmits data, it is required to determine a data transmission parameter to transmit data; FIG. 3 is a flowchart showing that the ultra-large bandwidth data transmission device determines a data transmission parameter according to an embodiment of the present invention, as shown in FIG. 3, which includes the steps as follows:

Step 301, an ultra-large bandwidth data transmission device acquires a system bandwidth to be achieved.

The system bandwidth is the bandwidth achieved by the ultra-large bandwidth data transmission device. In the embodiment of the disclosure, the ultra-large bandwidth data transmission device achieves a 75 MHz bandwidth, a 600 MHz bandwidth, a 500 MHz bandwidth and a 1 GHz bandwidth which are taken as examples for description.

Step 302, an FFT point number, a sampling point number corresponding to CP, a data subcarrier number, and a number of OFDM symbols in a subframe are determined.

The FFT point number, the sampling point number corresponding to the CP, the data subcarrier number and the number of OFDM symbols in the subframe, which are adopted when the ultra-large bandwidth data transmission device transmits data are respectively the same as an FFT point number, a sampling point number corresponding to the CP, a data subcarrier number, and a number of OFDM symbols in a subframe, which correspond to the LTE system with the specific bandwidth.

Step 303, the values of the parameters m and n are determined.

Step 304, a sampling rate is determined according to the parameters m and n.

m is the multiple frequency number of the sampling rate corresponding to the LTE system with the specific bandwidth. In the step 204, the values of the parameters m and n can be determined according to the formula as follows:

m=(p1^k1)×(p2^k2)×, ... , ×(pn^kn), where k1 to kn are exponents, and the values of k1–kn are natural numbers; p1 to pn are bases corresponding to k1 to kn, and the values of p1 to pn are prime numbers, m being less than n;

n is the fractional frequency number of the sampling rate corresponding to the LTE system with the specific bandwidth, the value range of n being from 1 to m−1.

The sampling rate $f_s=f_{LTE}\times(m/n)$, where $f_{LTE}$ is the sampling rate corresponding to the LTE system with the specific bandwidth.

The determined m and n ensure that the rolloff factor (i.e. actual bandwidth−ideal bandwidth)/ideal bandwidth) is in a preset range. In practical application, the value of the rolloff factor is between 10% and 30%, so that the data transmission device can perform sampling and filtering on the transmitted data.

Step 305, the ultra-large bandwidth data transmission device determines a subcarrier spacing according to the used sampling rate and FFT point number.

The subcarrier spacing is determined by the formula as follows: sampling rate=subcarrier spacing×FFT point number.

Step 306, the duration of the subframe and the corresponding relationship between the subframe and the radio frame are determined according to the sampling rate.

How to determine the duration of the subframe and the corresponding relationship between the subframe and the radio frame will be explained hereafter according to different radio frame structures.

After step 306, if the ultra-large bandwidth data transmission device adopts the TDD duplexing mode, an uplink and downlink configuration and a special subframe configuration are determined according to the service type.

How to implement ultra-large bandwidth data transmission will be explained hereafter with respect to different bandwidths, different duplexing modes and different CP types. The sampling rate to be achieved is $f_s=f_{LTE}\times(m/n)$, $f_{LTE}$ being the sampling rate corresponding to the LTE system with the specific bandwidth, and m and n being positive integers. FFT point numbers and sampling rates corresponding to LTE system with different bandwidths are as shown in table 2.

TABLE 2

| Bandwidth (MHz) | Minimum FFT point number | Sampling rate (MHz) |
|---|---|---|
| 1.4 | 128 | 1.92 |
| 3 | 256 | 3.84 |
| 5 | 512 | 7.68 |
| 10 | 1024 | 15.36 |
| 15 | 1536 | 23.04 |
| 20 | 2048 | 30.72 |

Explanations will be given hereafter in conjunction with table 2 and specific examples.

EXAMPLE 1

In the example, the ultra-large bandwidth data transmission device uses the 75 MHz bandwidth to transmit data in the subframe level transmission manner of a 3 MHz bandwidth LTE system: the FFT point number (determined according to table 2) is 256; the duplexing mode is FDD; and the CP type is normal CP. One radio frame comprises ten subframes; one subframe consists of two slots; each slot includes seven OFDM symbols; the CP length of the first OFDM symbol of each slot is 20 time domain sample points; and CP length of the other OFDM symbols in the slot is 18 time domain sample points.

The ultra-large bandwidth data transmission device determines a corresponding sampling rate according to the values m and n and the relationship between the sampling rate and a sampling rate of the 3 MHz bandwidth LTE system; the values m and n are determined as follows: m=2^α, where α, the power exponent of 2, is 6; n is 3; and the sampling rate of the data transmission device is $f_s=f_{LTE}\times(2^6/3)=81.92$ MHz.

Accordingly, the sampling rate=subcarrier spacing×FFT point number, then the corresponding subcarrier spacing is determined as 320 KHz;

The data carrier number is 180 which is the same as the data carrier number of the 3 MHz bandwidth LTE system.

According to fs, the sampling point number and subframe structure, the corresponding subframe length is determined by the formula: subframe length=[(FFT point number+the time domain sample point number corresponding to the CP of the first OFDM symbol in each slot)×the number of the first OFDM symbols in each subframe (FFT point number+ the time domain sample point number corresponding to the CP of the other OFDM symbols in each slot)×the number of the other OFDM symbols in each subframe]/fs. Then, the duration of one subframe is determined as 46.875 μs in the example; each subframe used by the ultra-large bandwidth data transmission device to transmit data comprises two slots; the CP duration of the first OFDM symbol in each slot=the time domain sample point number corresponding to the CP of the first OFDM symbol/$f_s$, that is 0.2441 μs, and the CP duration of the other OFDM symbols in each slot=the time domain sample point number corresponding to the CP of the other OFDM symbols in each slot/$f_s$, that is 0.2197 μs.

Figure 4:
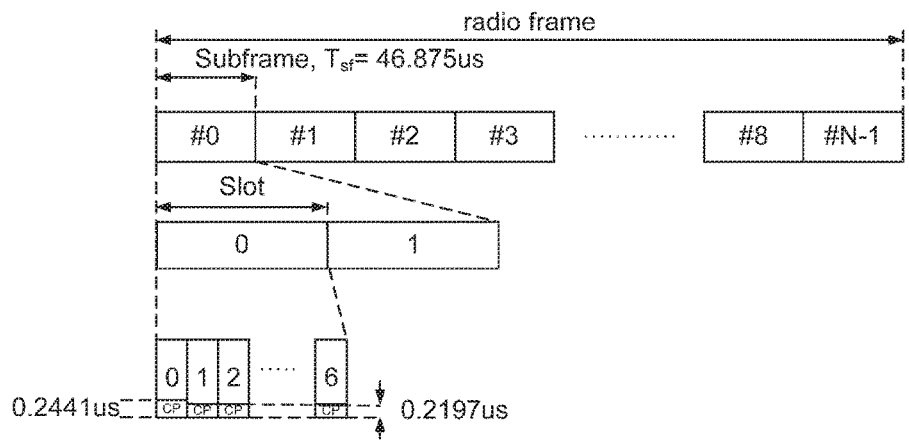
FIG. 4 is a first structural diagram of a frame according to an embodiment of the disclosure.

FIG. 4 shows the frame structure diagram that the ultra-large bandwidth data transmission device uses the 75 MHz bandwidth to transmit data. One radio frame comprises N subframes; the duration of one subframe $T_{sf}$ is 46.875 μs; one subframe consists of two slots; each slot comprises seven OFDM symbols; the CP length of the first OFDM symbol of each slot is 20 time domain sample points; and CP length of the other OFDM symbols in the slot is 18 time domain sample points, herein when the ultra-large bandwidth data transmission device determines the subframe number N in one radio frame, N is an integer obtained by rounding (10 ms/$T_{sf}$), thus ensuring the duration of one radio frame to be closest to an integral multiple of 10 ms.

When the ultra-large bandwidth data transmission device uses the 75 MHz bandwidth to transmit data, the corresponding transmission parameters are as shown in table 3.

TABLE 3

| | |
|---|---|
| System bandwidth | 75 MHz |
| FFT point number | 256 |
| Subcarrier spacing | 320 KHz |
| Sampling rate | 81.92 MHz |
| m/n | 64/3 |
| Data carrier number | 180 |
| CP type | Normal |
| CP duration | 0.2441 μs/0.2197 μs |
| Subframe duration | 46.875 μs |

EXAMPLE 2

In the example, the ultra-large bandwidth data transmission device uses the 600 MHz bandwidth to transmit data in the subframe level transmission manner of a 20 MHz bandwidth LTE system: the FFT point number (determined according to table 2) is 2048; the duplexing mode is TDD; and the CP type is normal CP. The CP length of the first OFDM symbol of each slot is 160 time domain sample points; and CP length of the other OFDM symbols in the slot is 144 time domain sample points.

The ultra-large bandwidth data transmission device determines a corresponding sampling rate according to the values m and n and the relationship between the sampling rate and the sampling rate of the 20 MHz bandwidth LTE system; the values m and n are determined as follows: $m=(2^{\alpha})\times(3^{\beta})$, where $\alpha$ and $\beta$ are respectively the power exponents of 2 and 3; and the sampling rate of the ultra-large bandwidth data transmission device is $f_s=f_{LTE}\times[(2^{\alpha})\times(3^{\beta})/3]=737.28$ MHz.

The determination methods of the duration of one subframe and the duration of the OFDM symbol in the subframe are the same as example 1, so unnecessary details will not be given herein. In the example, the duration of one subframe $T_{sf}$ is 41.67 µs (1/24 ms); the duration of the first OFDM symbol in each slot is 0.2170 µs, and the duration of the other OFDM symbols in each subframe is 0.1953 µs.

Accordingly, the sampling rate=subcarrier spacing×FFT point number, then the corresponding subcarrier spacing is determined as 360 KHz;

The data carrier number is 1200 which is the same as the data carrier number used by the 20 MHz bandwidth LTE system.

TABLE 4

| | |
|---|---|
| System bandwidth | 600 MHz |
| FFT point number | 2048 |
| Subcarrier spacing | 360 KHz |
| Sampling rate | 737.28 MHz |
| m/n | 24/1 |
| Data carrier number | 1200 |
| CP type | Normal |
| CP duration | 0.2170 µs/0.1953 µs |
| Subframe duration | 41.67 µs |

Figure 5:
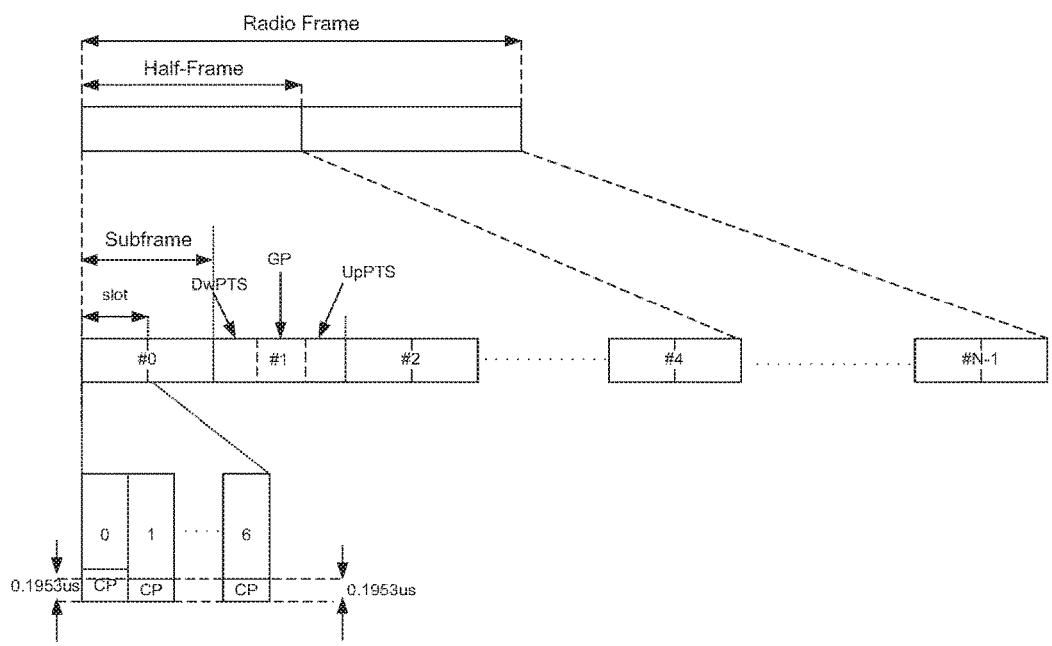
FIG. 5 is a second structural diagram of a frame according to an embodiment of the disclosure.

The transmission parameters of the ultra-large bandwidth data transmission device are as shown in table 4, and the corresponding frame structure diagram is as shown in FIG. 5. One radio frame consists of N subframes. According to the LTE uplink and downlink configuration options shown in table 5, the subframe with the serial number 1 in FIG. 5 is a special subframe; the DwPTS, GP and UpPTS in the special subframe respectively occupy 2, 2, and 10 OFDM symbols correspondingly. The number of OFDM symbols occupied in the special subframe is 14, which corresponds the number of OFDM symbols included in an uplink subframe or a downlink subframe, herein when the ultra-large bandwidth data transmission device determines the subframe number N in one radio frame, N is an integer obtained by rounding (10 ms/$T_{sf}$), thus ensuring the duration of one radio frame to be closest to an integral multiple of 10 ms.

TABLE 5

| Uplink and downlink configuration | Uplink and downlink handover period | Subframe serial number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In table 5, S represents a special subframe; D represents downlink; U represents uplink; and proper uplink and downlink configurations are selected from the table according to service characteristic to support asymmetrical data services.

EXAMPLE 3

In the example, the ultra-large bandwidth data transmission device uses the 500 MHz bandwidth to transmit data in the subframe level transmission manner of a 20 MHz bandwidth LTE system: the FFT point number (determined according to table 2) is 2048; the duplexing mode is FDD; and the CP type is extended CP. The CP length of all the OFDM symbols in the slot is 512 time domain sample points.

The ultra-large bandwidth data transmission device determines a corresponding sampling rate according to the values m and n and the relationship between the sampling rate and the sampling rate $f_{LTE}$ of the 20 MHz bandwidth LTE system; the values m and n are determined as follows: $m=(2^{\alpha})\times(5^{\beta})$, wherein $\alpha=2$, $\beta=1$, n=1; and the sampling rate of the ultra-large bandwidth data transmission device is $f_s=f_{LTE}\times[(2^{\alpha})\times(5^{\beta})]/1)=614.4$ MHz.

Accordingly, the duration of one subframe [(FFT point number+the CP length of each OFDM symbol)×the number of the OFDM symbols in each subframe]/fs, then the duration of one subframe in the embodiment is determined as 50 µs; accordingly, the CP duration of one OFDM symbol=the time domain sample points corresponding to the CP length of the OFDM symbol/fs, the CP duration of the OFDM symbol is 0.6944 µs.

Accordingly, the sampling rate=subcarrier spacing×FFT point number, the ultra-large bandwidth data transmission device determines the corresponding subcarrier spacing as 300 KHz.

The determined transmission parameters are as shown in table 6:

TABLE 6

| | |
|---|---|
| System bandwidth | 500 MHz |
| FFT point number | 2048 |
| Subcarrier spacing | 300 KHz |
| Sampling rate | 614.4 MHz |
| m/n | 20/1 |
| CP type | Extended |
| CP duration | 0.6944 µs |
| Subframe duration | 50 µs |

Figure 6:
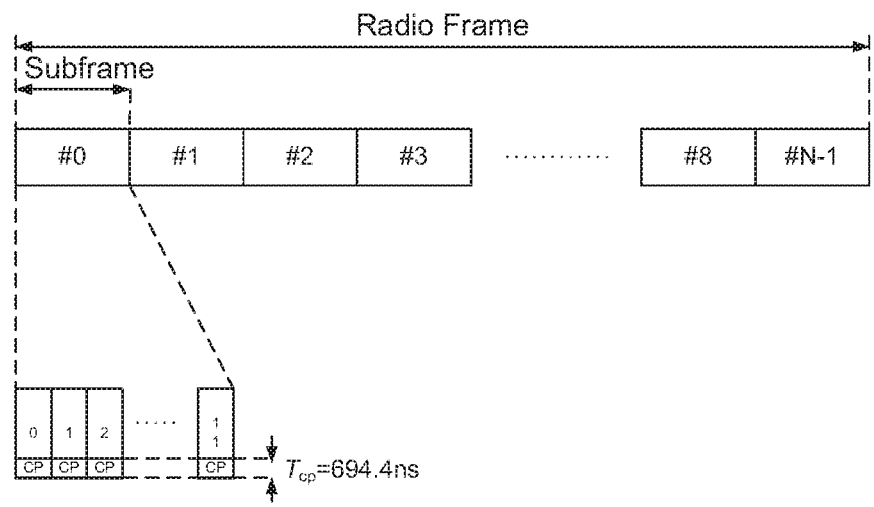
FIG. 6 is a third structural diagram of a frame according to an embodiment of the disclosure.

FIG. 6 shows the frame structure diagram that the ultra-large bandwidth data transmission device transmits data. One radio frame comprises N subframes; the duration of one subframe is 50 µs (1120 ms); one radio frame consists of ten subframes; each subframe consists of two slots; each slot comprises seven OFDM symbols; the CP length of the each OFDM symbol in the slot is 512 time domain sample points; and the corresponding duration is 0.1953 μs, wherein when the ultra-large bandwidth data transmission device determines the subframe number N in one radio frame, N is an integer obtained by rounding (10 ms/$T_{sf}$), thus ensuring the duration of one radio frame to be closest to an integral multiple of 10 ms.

EXAMPLE 4

In the example, the ultra-large bandwidth data transmission device uses the 1 GHz bandwidth to transmit data in the subframe level transmission manner of a 20 MHz bandwidth LTE system: the FFT point number (determined according to table 2) is 2048; the duplexing mode is FDD, and the CP type is extended CP. The CP length of all the OFDM symbols is 512 time domain sample points.

The ultra-large bandwidth data transmission device determines a corresponding sampling rate according to the values m and n and the relationship between the sampling rate and the sampling rate of the 20 MHz bandwidth LTE system; the values m and n are determined as follows: m=$(2^\alpha) \times (3^\beta)$, wherein α=2, β=2, n=1; and the sampling rate of the ultra-large bandwidth data transmission device is $f_s = f_{LTE} \times [(2^\alpha) \times (3^\beta)]/1$ = 1105.92 MHz Accordingly, the sampling rate=subcarrier spacing×FFT point number, the corresponding subcarrier spacing is determined as 320 KHz;

Accordingly, the duration of one subframe [(FFT point number+the CP length of each OFDM symbol)×the number of the OFDM symbols in each subframe]/fs, the duration of one subframe in the example is determined as 27.8 μs; accordingly, the CP duration of one OFDM symbol=the time domain sample points corresponding to the CP length of the OFDM symbol/fs, the CP duration of the OFDM symbol is 0.463 μs.

Figure 7:
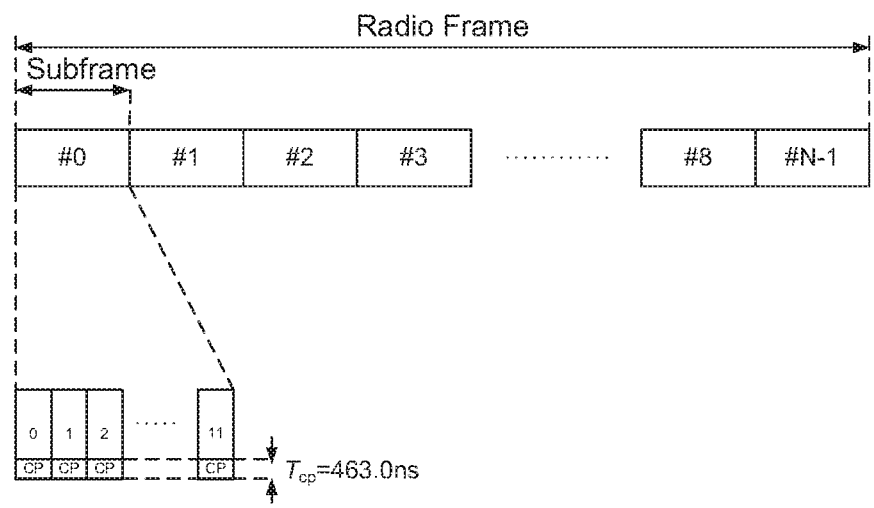
FIG. 7 is a fourth structural diagram of a frame according to an embodiment of the disclosure.

The determined transmission parameters are as shown in table 7, and the corresponding frame structure diagram is as shown in FIG. 7. One radio frame consists of N subframes. The CP duration of the OFDM symbols in the subframe is 0.463 μs, wherein when the ultra-large bandwidth data transmission device determines the subframe number N in one radio frame, N is an integer obtained by rounding (10 ms/$T_{sf}$), thus ensuring that the duration of one radio frame to be closest to an integral multiple of 10 ms.

TABLE 7

| | |
|---|---|
| System bandwidth | 1000 MHz |
| FFT point number | 2048 |
| Subcarrier spacing | 540 KHz |
| Sampling rate | 1105.92 MHz |
| m/n | 36/1 |
| CP type | Extended |
| CP duration | 0.463 μs |
| Subframe duration | 27.8 μs |

Figure 8:
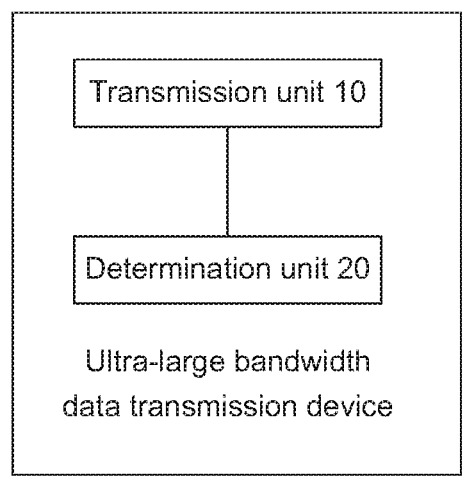
FIG. 8 is a structural diagram of an ultra-large bandwidth data transmission device according to an embodiment of the disclosure.

The embodiment of the disclosure further provides an ultra-large bandwidth data transmission device, used for implementing the ultra-large bandwidth data transmission method. As shown in FIG. 8, the ultra-large bandwidth data transmission device comprises:

a transmission unit 10 configured to transmit data in a subframe level manner of an LTE system with a specific bandwidth;

herein a sampling rate of the transmission unit is m/n times of a sampling rate corresponding to the LTE system with the specific bandwidth, m and n being positive integers; and a determination unit 2, configured to determine the values of the parameters m and n.

Herein, the transmission unit 10 is further configured to, when transmitting the data, adopt an FFT point number corresponding to the LTE system with the specific bandwidth, a sampling point number corresponding to CP, a data subcarrier number and a number of OFDM symbols in a subframe;

the specific bandwidth comprises 1.4 MHz bandwidth, 3 MHz bandwidth, 5 MHz bandwidth, 10 MHz bandwidth and 20 MHz bandwidth.

Herein, the transmission unit 10 is further configured to transmit data using a radio frame containing ten subframes; or, transmit the data using a radio frame containing a specific number of subframes, the specific number of subframes being used for enabling the length of the radio frame to be closest to an integral multiple of 10 ms, and a sum of a number of OFDM symbols of a DwPTS, a number of OFDM symbols of a GP and a number of OFDM symbols of an UpPTS in a special subframe of the radio frame corresponding to a number of OFDM symbols of one subframe; herein the value range of the DwPTS symbol number in the special subframe of the radio frame is from 1 to 10; the value range of the GP symbol number is from 1 to 4; and the value range of the UpPTS symbol number is from 1 to 10.

Herein, m is a product of nonnegative integral powers of a specific prime number, and n is less than m.

Herein, the specific prime number is 2, 3 or 5.

The LTE system with the specific bandwidth has an LTE TDD mode and an LTE FDD mode.

Herein the CP used by the specific bandwidth LTE system includes a normal CP and an extended CP.

In practical application, the data transmission unit 10 can be implemented by a transmitter in the ultra-large bandwidth data transmission device; and the determination unit 20 can be implemented by a CPU (Central Processing Unit) in the ultra-large bandwidth data transmission device, a DSP (Digital Signal Processor) or a FPGA (Field Programmable Gate Array).

The embodiment of the present invention further provides a computer storage medium having stored therein a computer executable instruction for executing the ultra-large bandwidth data transmission method.

Those skilled in the art shall understand that the embodiment of the present invention can be provided as method, system or computer program product. Therefore, the present invention can adopt the forms of hardware embodiment, software embodiment, or software-hardware combined embodiment. Furthermore, the present invention can adopt the form of a computer program product which is executable on one or more computer available storage mediums (including but not limited to disc memory, optical memory and the like) comprising computer available program codes therein.

The present invention is described with reference to the flowchart and/or block diagram of the method, device (system), and computer program product according to the embodiment of the present invention. What should be understood is that a computer program instruction can be used to achieve every flow and/or block in the flowchart and/or block diagram, and the combination of flows and/or blocks in the flowchart and/or block diagram. The computer program instruction can be uploaded onto a general purpose computer, a special purpose computer, an embedded processor or the processors of other programmable data processing devices to produce a machine, such that a device for achieving the functions specified in one or more flows of the flowchart and/or one or more blocks of the block diagram is produced through the instruction executed by the computer or the processors of other programmable data processing devices.

The computer program instruction can also be stored in a computer readable memory which is capable of booting the computer or other programmable data processing devices to work in a specific manner, such that a product comprising an instruction device is produced through the instruction stored in the computer readable memory, the instruction device achieving the functions specified in one or more flows of the flowchart and/or one or more blocks of the block diagram.

The computer program instruction can also be uploaded onto a computer or other programmable data processing devices, such that a series of operation steps can be executed on the computer or other programmable devices to produce computer processing, thus the instruction executed on the computer or other programmable devices can be provided and used in the step of achieving the functions specified in one or more flows of the flowchart and/or one or more blocks of the block diagram.

What described above are only the preferable embodiments of the present invention, but not used to restrict the present invention. For those skilled in the art, the present invention may have various changes and variations. Any amendments, equivalent substitutions, improvements etc. within the spirit and principle of the present invention are all concluded in the protection scope of the present invention.

What is claimed is:

1. An ultra-large bandwidth data transmission method, performed in a small cell base station comprising a processor and a transmitter, the method comprising:
    transmitting, by the transmitter, ultra-large bandwidth data in a subframe level manner of a Long Term Evolution (LTE) system with a specific bandwidth, comprising:
        obtaining, by the processor, a value of an ultra-large bandwidth used for transmitting ultra-large bandwidth data, and a value of the specific bandwidth of the LTE system;
        determining, by the processor, a value of a parameter corresponding to the specific bandwidth;
        wherein the parameter comprises a sampling rate and the specific bandwidth comprises 1.4 MHz bandwidth, 3 MHz bandwidth, 5 MHz bandwidth, 10 MHz bandwidth and 20 MHz bandwidth, and
        determining, by the processor, values of multiple frequency number m and fractional frequency number n of the sampling rate corresponding to the specific bandwidth, where m=(p1^ k1)×(p2^ k2)×, . . . ,×(pi^ ki), m and n are positive integers, k1 to ki are exponents, values of k1 to ki are natural numbers, p1 to pi are bases corresponding to k1 to ki, values of p1 to pi are prime numbers, and a value range of n is from 1 to m−1;
        transforming, by the processor, a value of the sampling rate corresponding to the specific bandwidth into a value of a sampling rate corresponding to the ultra-large bandwidth, the value of the sampling rate corresponding to the ultra-large bandwidth being m/n times of the value of the sampling rate corresponding to the specific bandwidth; and
        determining, by the processor, a subcarrier spacing corresponding to the ultra-large bandwidth according to an equation of:
        the sampling rate corresponding to the ultra-large bandwidth=the subcarrier spacing×a Fast Fourier Transformation (FFT) point number corresponding to the specific bandwidth; and
        transmitting, by the transmitter, the ultra-large bandwidth data based on the sampling rate corresponding to the ultra-large bandwidth and subcarrier spacing corresponding to the ultra-large bandwidth.

2. The method according to claim 1, wherein transmitting, by the transmitter, the ultra-large bandwidth data in the subframe level manner of the LTE system with the specific bandwidth comprises:
    when the transmitter transmits the ultra-large bandwidth data, adopting the FFT point number, a sampling point number corresponding to Cyclic Prefix (CP), a data subcarrier number and a number of Orthogonal Frequency Division Multiplexing (OFDM) symbols in a subframe, which correspond to the specific bandwidth.

3. The method according to claim 1, wherein transmitting, by the transmitter, the ultra-large bandwidth data in the subframe level manner of the LTE system with the specific bandwidth comprises:
    transmitting, by the transmitter, the ultra-large bandwidth data using a radio frame containing 10 subframes; or,
    transmitting, by the transmitter, the ultra-large bandwidth data using a radio frame containing a specific number of subframes, the specific number of subframes being used for enabling the length of the radio frame to be closest to an integral multiple of 10 ms, and a sum of a number of Orthogonal Frequency Division Multiplexing (OFDM) symbols of a Downlink Pilot Time Slot (DwPTS), a number of OFDM symbols of a Guard Period (GP) and a number of OFDM symbols of an Uplink Pilot Time Slot (UpPTS) in a special subframe of the radio frame corresponding to a number of OFDM symbols of one subframe.

4. The method according to claim 1, wherein m is a product of nonnegative integral powers of a specific prime number, and n is less than m.

5. The method according to claim 4, wherein the specific prime number is 2, 3 or 5.

6. The method according to claim 1, wherein the LTE system with the specific bandwidth has an LTE Time Division Duplexing (TDD) mode and an LTE Frequency Division Duplexing (FDD) mode.

7. The method according to claim 1, wherein a Cyclic Prefix (CP) used by the LTE system with the specific bandwidth comprises a normal CP and an extended CP.

8. An ultra-large bandwidth data transmission device, for use in a small cell base station comprising a processor and a transmitter, the ultra-large bandwidth data transmission device comprising:
    the transmitter is configured to transmit data in a subframe level manner of a Long Term Evolution (LTE) system with a specific bandwidth;
    the processor is configured to:
        obtain a value of an ultra-large bandwidth used for transmitting ultra-large bandwidth data, and a value of the specific bandwidth of the LTE system;
        determine a value of a parameter corresponding to the specific bandwidth; wherein the parameter comprises a sampling rate and the specific bandwidth comprises 1.4 MHz bandwidth, 3 MHz bandwidth, 5 MHz bandwidth, 10 MHz bandwidth and 20 MHz bandwidth;

determine values of multiple frequency number m and fractional frequency number n of the sampling rate corresponding to the specific bandwidth, where $m=(p1^{k1})\times(p2^{k2})\times, \ldots, \times(pi^{ki})$, m and n are positive integers, k1 to ki are exponents, values of k1-kn are natural numbers, p1 to pi are bases corresponding to k1 to ki, values of p1 to pi are prime numbers, and a value range of n is from 1 to m−1;

transform a value of the sampling rate corresponding to the specific bandwidth into a value of a sampling rate corresponding to the ultra-large bandwidth, the value of the sampling rate corresponding to the ultra-large bandwidth being m/n times of the value of the sampling rate corresponding to the specific bandwidth; and determine a subcarrier spacing corresponding to the ultra-large bandwidth according to an equation of:

the sampling rate corresponding to the ultra-large bandwidth=the subcarrier spacing×a Fast Fourier Transformation (FFT) point number corresponding to the specific bandwidth; and the transmitter is further configured to transmit the ultra-large bandwidth data based on the sampling rate corresponding to the ultra-large bandwidth and subcarrier spacing corresponding to the ultra-large bandwidth.

9. The ultra-large bandwidth data transmission device according to claim 8, wherein the transmitter is further configured to, when transmitting the ultra-large bandwidth data, adopt the FFT point number, a sampling point number corresponding to Cyclic Prefix (CP), a data subcarrier number and a number of Orthogonal Frequency Division Multiplexing (OFDM) symbols in a subframe, which correspond to the specific bandwidth.

10. The ultra-large bandwidth data transmission device according to claim 8, wherein the transmitter is further configured to: transmit the ultra-large bandwidth data using a radio frame containing 10 subframes; or, transmit the ultra-large bandwidth data using a radio frame containing a specific number of subframes, the specific number of subframes being used for enabling the length of the radio frame to be closest to an integral multiple of 10 ms, and a sum of a number of Orthogonal Frequency Division Multiplexing (OFDM) symbols of a Downlink Pilot Time Slot (DwPTS), a number of OFDM symbols of a Guard Period (GP) and a number of OFDM symbols of an Uplink Pilot Time Slot (UpPTS) in a special subframe of the radio frame corresponding to a number of OFDM symbols of one subframe.

11. The ultra-large bandwidth data transmission device according to claim 8, wherein m is a product of nonnegative integral powers of a specific prime number, and n is less than m.

12. The ultra-large bandwidth data transmission device according to claim 11, wherein the specific prime number is 2, 3 or 5.

13. The ultra-large bandwidth data transmission device according to claim 8, wherein LTE system with the specific bandwidth has an LTE Time Division Duplexing (TDD) mode and an LTE Frequency Division Duplexing (FDD) mode.

14. The ultra-large bandwidth data transmission device according to claim 8, wherein a Cyclic Prefix (CP) used by the LTE system with the specific bandwidth comprises a normal CP and an extended CP.

15. A non-transitory computer storage medium having stored therein a computer executable instruction for executing an ultra-large bandwidth data transmission method, performed in a small cell base station comprising a processor and a transmitter, the method comprising:

transmitting, by the transmitter, ultra-large bandwidth data in a subframe level manner of a Long Term Evolution (LTE) system with a specific bandwidth, comprising:

obtaining, by the processor, a value of an ultra-large bandwidth used for transmitting ultra-large bandwidth data, and a value of the specific bandwidth of the LTE system;

determining, by the processor, a value of a parameter corresponding to the specific bandwidth; wherein the parameter comprises a sampling rate and the specific bandwidth comprises 1.4 MHz bandwidth, 3 MHz bandwidth, 5 MHz bandwidth, 10 MHz bandwidth and 20 MHz bandwidth, and determining, by the processor, values of multiple frequency number m and fractional frequency number n of the sampling rate corresponding to the specific bandwidth, where $m=(p1^{k1})\times(p2^{k2})\times, \ldots, \times(pi^{ki})$, m and n are positive integers, k1 to ki are exponents, values of k1-kn are natural numbers, p1 to pi are bases corresponding to k1 to kn, values of p1 to pi are prime numbers, and a value range of n is from 1 to m−1;

transforming, by the processor, a value of the sampling rate corresponding to the specific bandwidth into a value of a sampling rate corresponding to the ultra-large bandwidth, the value of the sampling rate corresponding to the ultra-large bandwidth being m/n times of the value of the sampling rate corresponding to the specific bandwidth; and determining, by the processor, a subcarrier spacing corresponding to the ultra-large bandwidth according to an equation of:

the sampling rate corresponding to the ultra-large bandwidth=the subcarrier spacing×a Fast Fourier Transformation (FFT) point number corresponding to the specific bandwidth; and transmitting, by the transmitter, the ultra-large bandwidth data based on the sampling rate corresponding to the ultra-large bandwidth and subcarrier spacing corresponding to the ultra-large bandwidth.

16. The ultra-large bandwidth data transmission device according to claim 9, wherein a Cyclic Prefix (CP) used by the LTE system with the specific bandwidth comprises a normal CP and an extended CP.

17. The ultra-large bandwidth data transmission device according to claim 10, wherein a Cyclic Prefix (CP) used by the LTE system with the specific bandwidth comprises a normal CP and an extended CP.

18. The ultra-large bandwidth data transmission device according to claim 11, wherein a Cyclic Prefix (CP) used by the LTE system with the specific bandwidth comprises a normal CP and an extended CP.

19. The ultra-large bandwidth data transmission device according to claim 12, wherein a Cyclic Prefix (CP) used by the LTE system with the specific bandwidth comprises a normal CP and an extended CP.

20. The ultra-large bandwidth data transmission device according to claim 13, wherein a Cyclic Prefix (CP) used by the LTE system with the specific bandwidth comprises a normal CP and an extended CP.

* * * * *